April 30, 1940.  E. P. RENAUX ET AL  2,198,842
DEVICE FOR THE MOUNTING OF AN ENGINE OR LIKE APPARATUS ON ITS SUPPORT
Filed Aug. 9, 1937  4 Sheets-Sheet 3
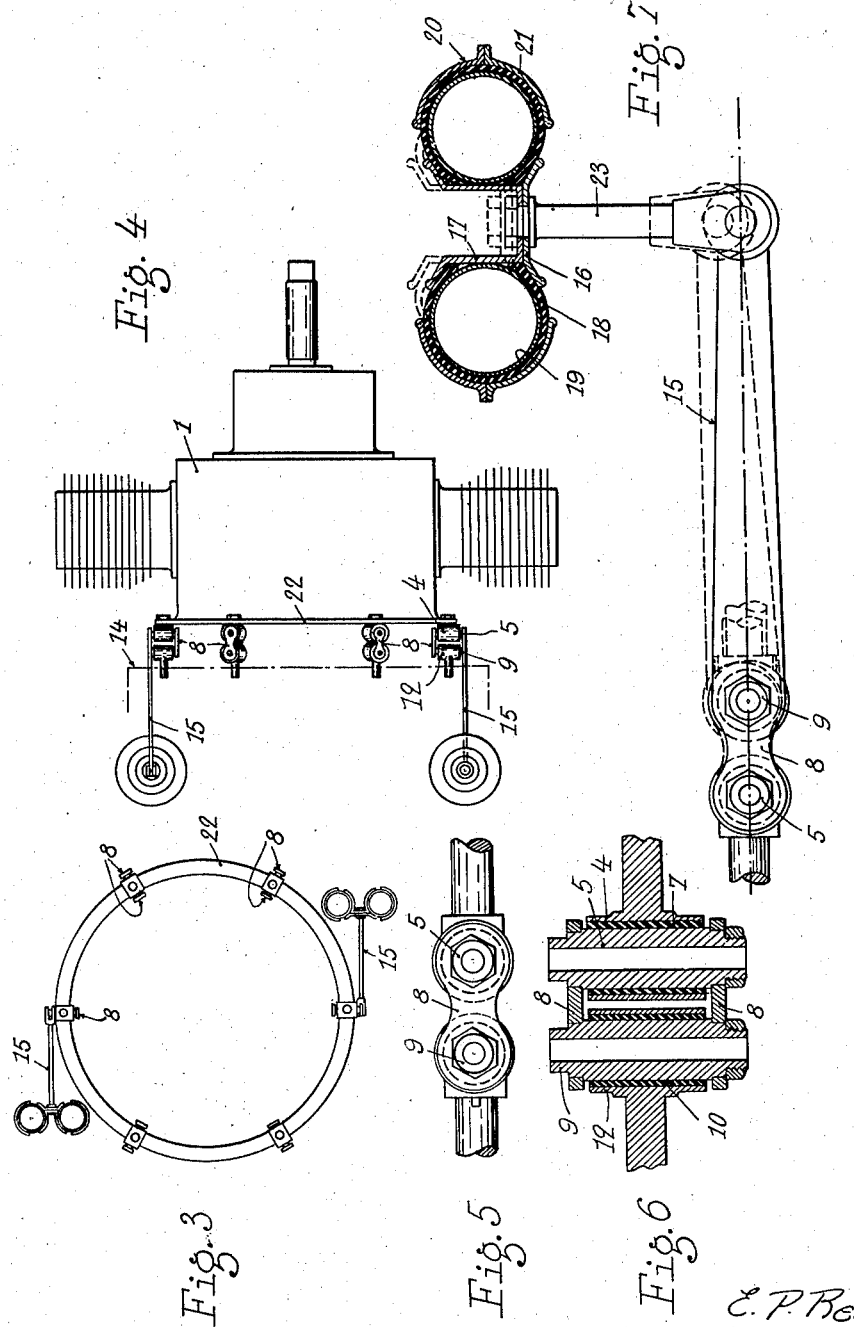

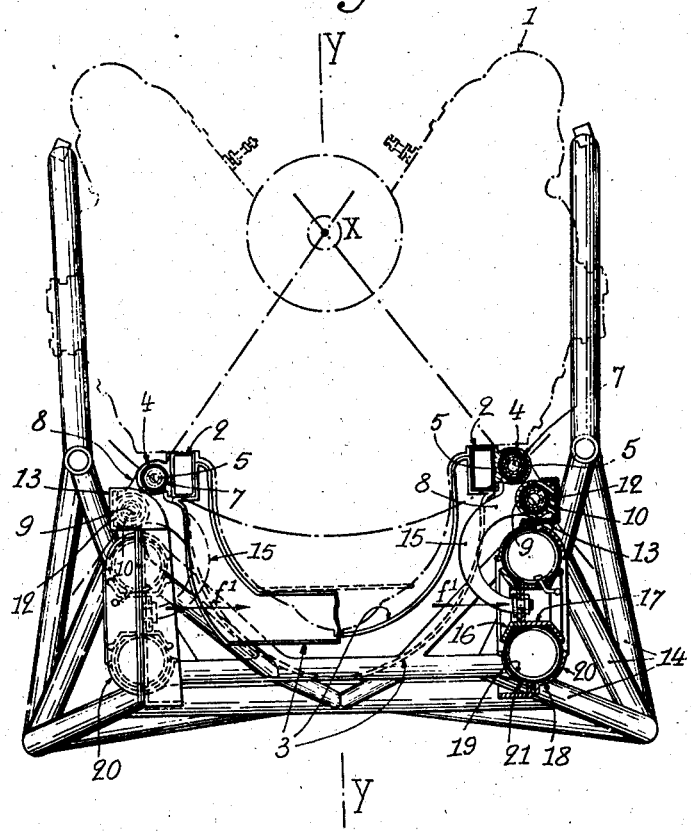
Fig.2
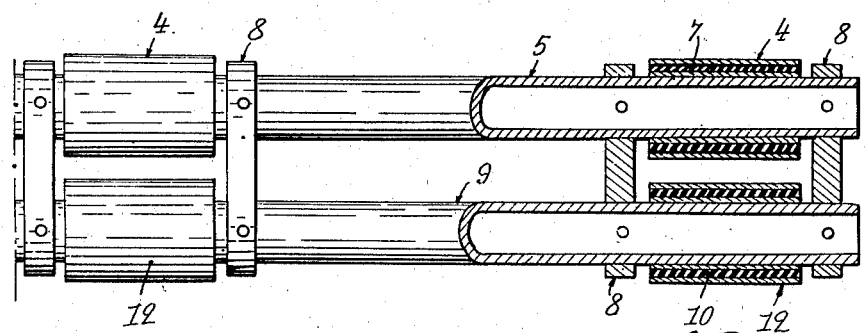
Fig.2ª

April 30, 1940.   E. P. RENAUX ET AL   2,198,842
DEVICE FOR THE MOUNTING OF AN ENGINE OR LIKE APPARATUS ON ITS SUPPORT
Filed Aug. 9, 1937   4 Sheets-Sheet 4
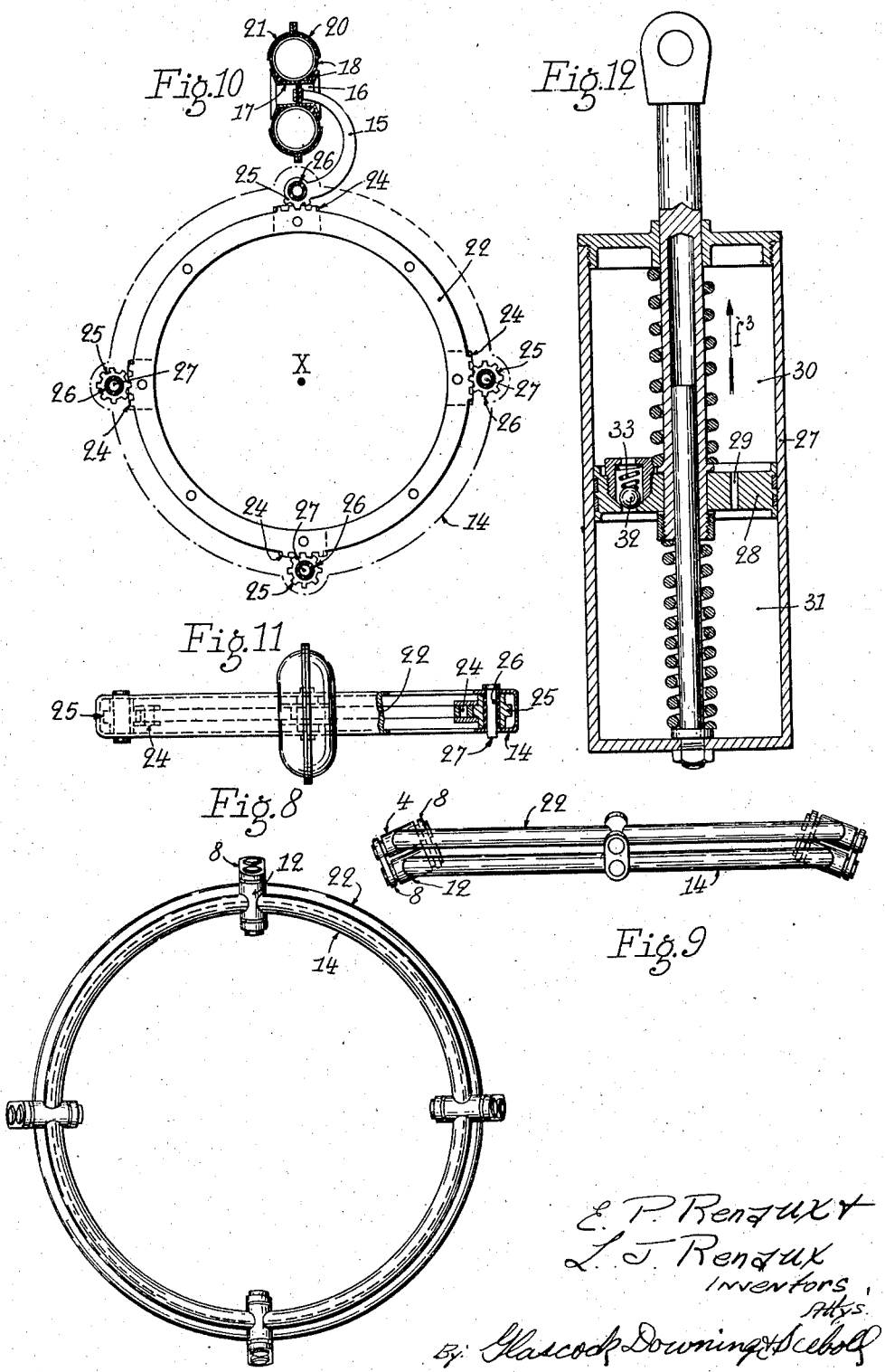

Patented Apr. 30, 1940

2,198,842

UNITED STATES PATENT OFFICE 2,198,842

DEVICE FOR THE MOUNTING OF AN ENGINE OR LIKE APPARATUS ON ITS SUPPORT

Eugène Prosper Renaux, Paris, and Lucien Jules Renaux, Livry-Gargan, France

Application August 9, 1937, Serial No. 158,216
In France August 17, 1936

8 Claims. (Cl. 248—5)

The present invention relates to an improved device for securing engines or other apparatus, comprising one or more parts having a movement of rotation or of oscillation about an axis, upon a support or frame, such as a test bench, the chassis of a land or water vehicle, the framework of an aeroplane, or the like.

The said device is chiefly characterized by the fact that it comprises, in combination:

Means for connecting the engine or other apparatus with its support, in such manner that this engine or other apparatus may oscillate as a whole about the axis of oscillation or of rotation of its part or parts in movement, Elastic means adapted to dampen and to absorb the different vibrations of high frequency, And one or more shock-absorbing devices, of an aperiodic nature, which counteract the oscillations of greater amplitude and of low frequency.

According to one embodiment, the engine or other apparatus is connected by links or other members to its support, the two pivot joints of each link being provided with elastic shock-absorbers, for instance of the type with rings of rubber or like elastic material subject to a suitable deformation, in such manner as to dampen all vibrations of high frequency, but to permit the oscillations of low frequency, even those having a relatively great amplitude.

In another embodiment, the engine or other apparatus is provided with toothed sectors which are concentric with its axis of oscillation and are engaged with toothed pinions mounted on shafts which are parallel with the said axis of oscillation, elastic shock-absorbing devices (such as rings of rubber or like elastic material subject to a suitable deformation for example) serving to counteract the vibrations of high frequency of each of the said pinions with reference to its axis, but permitting the oscillations of low frequency, even those having a relatively great amplitude.

As concerns the device or devices for absorbing the oscillations having a low frequency, but whose amplitude may be relatively great, produced by the engine or like apparatus, each of these may consist to advantage of a pneumatic device operating by adjustable pressure or at- mospheric pressure, which is located between the support and a member participating, directly or indirectly, in the oscillations of the engine or other apparatus.

Use may be further made of one or more aperiodic pneumatic or hydraulic shock-absorbers of the type comprising a piston or like part.

Preferably, a device for increasing the amplitude of the oscillations is interposed, directly or indirectly, between the engine or other apparatus and the or each of the aperiodic shock-absorbing devices.

The invention has further for its object the combination consisting of an engine or like apparatus which is connected, by a suspension of the aforesaid type, with a frame or like support.

In the accompanying drawings, which are given solely by way of example:

Fig. 2 is a corresponding end view, with a partial section on the line 2—2 of Fig. 1.

Figure 1:
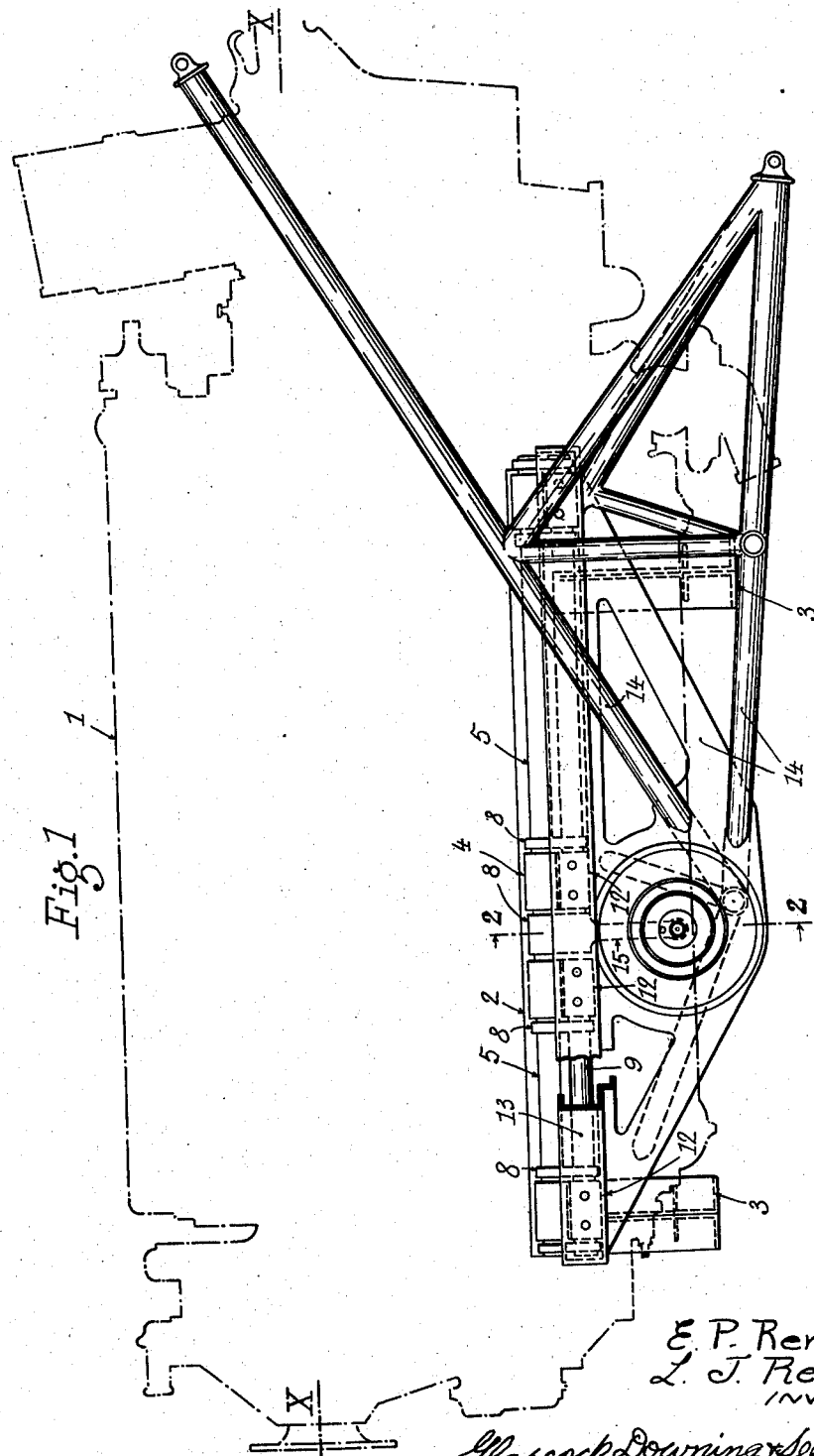
Fig. 1 is an elevational view of an engine with cylinders in line, which is mounted, in conformity with the invention, upon a support which may form part of the fuselage of an aeroplane.

Fig. 2$^a$ is a partial view on a larger scale, and with parts broken away, of one of the elastic devices for connecting the engine with the support.

Fig. 3 is an analogous view of a modification, in the case of an engine of the radial type.

Fig. 4 is a corresponding side view.

Fig. 5 is a view on a larger scale of one of the double members for connecting the engine with its support.

Fig. 6 is a corresponding plan view, with partial section.

Fig. 7 shows the connection between one of these double members and one of the pneumatic shock-absorbing devices.

Figs. 8 and 9 are respectively a front and a plan view of a modification of the device shown in Figs. 3 and 4.

Figs. 10 and 11 are similar views of another modification.

Fig. 12 is a longitudinal section of an aperiodic shock-absorber comprising a cylinder and piston with dash-pot, which is adapted for this use.

In the embodiment shown in Figs. 1, 2 and 3, the engine 1 is an engine having two rows of cylinders in V shape; the line XX represents the axis of the driving shaft. The crankcase of the engine is firmly secured to two side beams 2 which are parallel with the axis XX equidistant from this axis, and symmetrical with reference to the vertical longitudinal plane YY (Fig. 2) passing through this axis. The said beams 2 are cross-connected by a certain number of cross-pieces 3, thus forming a rigid cradle.

On the outer side of each beam 2 is mounted, by means of supporting sockets 4, a tubular shaft 5, the axis of which is parallel with the axis XX. Between the shaft 5 and the sockets 4 is interposed a ring 7 of rubber or like elastic material, which serves to dampen the radial or oblique vibrations of the tube 5 with reference to the supports 4, but will permit oscillations of great amplitude but of low frequency, in this tube, with reference to the said supports 4. To each tube 5 are keyed one or more links 8, which are mounted in pairs, or not. Each link 8 is keyed at its other end to a tube 9 which is mounted in a manner resembling this mounting of the tube 5, i. e., with the interposition of a bushing or of elastic rings 10, which absorb vibrations of high frequency but will permit the vibrations of low frequency, in the bearings 12 (Figs. 1, 2 and 2a). The axes of the tubes 9 are parallel with the axes of the tubes 5, and like these latter, are equidistant from the axis XX in the idle position. The supporting bearings 12 are mounted in longitudinal beams 13 which are parallel with the beams 2 of the cradle and form part of the frame 14 pertaining for instance to the fuselage of an aeroplane.

On either side of the engine 1, one or more of the links 8 are extended by an arm 15. The end of said arm 15, which is located at a greater distance from the axis of the tube 9 than the distance between the axes of the two tubes 5 and 9, is secured to a fitting 16, rigidly secured to another fitting 17 and forming with this latter a rim. In the said rim is engaged, by its beading, a pneumatic member 18, provided with an inner air tube 19. The outside of the said pneumatic member 18 is held in the half-shells 20 and 21 which are rigidly secured to the frame 14.

With such a construction the high frequency vibrations of the engine are absorbed by the bushings or rings 7 and 10 of rubber or like material, whatever be the direction of these vibrations (perpendicular or oblique to the axis XX and hence to the axes of the tubes 5 and 9), and the same is true for the high frequency vibrations taking place around the axis XX, as these oscillations are damped by the said masses of rubber or like material.

On the contrary, the oscillations of greater amplitude but of low frequency, of the engine 1 about the axis XX are not absorbed by the rings or bushings 7 and 10, which do not practically oppose these oscillations. In this case, the links 8 oscillate about the tubes 5 and 9, and the axes 8 of the tubes 5 describe portions of cylinders about the axes of the tubes 9, and thus the axis XX will in fact be subject to slight displacements of the nature of translation, while remaining parallel to the same direction, whilst the engine as a whole will oscillate about the said axis XX. But owing to the oscillations of the links 8 about the axes of the tubes 9, the arms 15 will act upon the rims 16—17 of the pneumatic members 18, in the direction of the arrows $f^1$, or in the contrary direction (Fig. 2). The said pneumatic members oppose, in an elastic manner, the efforts exerted by the arms 15; they act against their movements and thus against the low frequency oscillations of the engine 1 about the axis XX. As the pneumatic members 18 form shock-absorbers which are quite aperiodic, they tend constantly to restore the engine or other suspended device to its normal position of equilibrium, without going beyond this position, i. e., without commencing a vibration in the contrary direction.

It should be noted that the arms 15 produce an increase between the amplitudes of the vibrations of the engine 1 and of the links on the one hand, and the vibrations of the pneumatic members 18 on the other hand, and hence a reduction, of the same value, of the forces which must be supported by the said pneumatic members.

In short, the whole construction operates in excellent conditions of performances and safety, and the engine 1 or like apparatus has always a great facility in its angular displacements, while maintaining its axis XX in the parallel position in all cases.

Figs. 3 to 7 represent an application of the invention to the case of an engine 1 of the radial type, or like apparatus, which is mounted at the end, in the overhung position. In this case, the links 8 are mounted in pairs, and are keyed to axles 5 and 9 which are located—with the interposition of rubber members—in the interior of two sockets 4 and 12 (Figs. 5 and 6). The sockets 4 are rigidly secured to an annulus 22 forming the base of the engine 1. The sockets 12 are rigidly attached to the support 14 (Fig. 4). The links 8 are perpendicular to the annulus 22. Two or more of the said links 8 are extended by an arm 15 (Figs. 3, 4, 7). The said arm 15 is connected by a rod 23 to the rim (16, 17) which holds a pneumatic member 18, with its inner tube 19 maintained in the parts 20 and 21 which are rigidly secured to the support 14.

Figs. 8 and 9 represent a modification in which the annuli 22 and 14 are of different size. The double links 8 are oblique with reference to the planes of the said annuli.

Figs. 10 and 11 show a modification in which the links of the preceding examples are eliminated and are replaced by the engagement of toothed sectors 24, which are mounted on the annulus 22 of the engine 1 or the like and are concentric with the axis XX, with the pinions 25. The said pinions 25 are mounted—with the interposition of rings 26 of rubber or like elastic material—on shafts 27 which are secured to the support 14. To one or more of the pinions 25 is rigidly secured an arm 15 which cooperates, as in the preceding embodiments, with a pneumatic shock-absorbing device 18.

On the other hand, the said pneumatic members 18, in the various embodiments herein described, may be replaced by any other type of aperiodic shock-absorber, for instance a hydraulic or pneumatic shock-absorber containing a cylinder 27 and a piston 28. The said piston 28 comprises, on the one hand, a small orifice 29 which provides for a slight flow of the liquid from the chamber 30 to the chamber 31 when the piston 28 moves in the direction of the arrow $f^3$, and on the other hand, a valve 32 which is urged upon its seat by a spring 33 and forms a dash-pot, also providing for an additional flow of liquid from the chamber 31 to the chamber 30 when the piston 28 moves in the contrary direction to the arrow $f^3$.

Obviously, the said invention is not limited to the embodiments herein described and represented, which are given solely by way of example. It is quite evident that the pneumatic or other shock-absorbers may have any suitable position with reference to the suspended apparatus, whether in proximity to the said apparatus, or at a point located at a distance from the same. The connection which is made with the said apparatus by the links 15 in the embodiments herein represented, may be effected at a distance by mechanical or hydraulic operation.

Having now described our invention what we claim as new and desire to secure by Letters Patent is:

1. In a suspension for an apparatus having parts rotating or oscillating about an axis and subjected to vibrations of high frequency and little amplitude and to vibrations of low frequency and great amplitude, in combination a support, a plurality of pairs of pivots disposed at the same distance from said axis, each pair of pivots comprising a pivot secured on said apparatus and a pivot secured on said support, connecting links between the two pivots of each pair, whereby said apparatus is adapted to be displaced on great amplitudes with respect to said support, elastic means between each link and its corresponding pivots adapted to resist elastically to displacements of little amplitude and to yield for displacements of great amplitude between said apparatus and said support, and aperiodic damping means carried by said support and connected with at least one of said links and adapted to resist elastically to displacements of great amplitude between said apparatus and said support.

2. In a suspension for an apparatus having parts rotating or oscillating about an axis and subjected to vibrations of high frequency and little amplitude and to vibrations of low frequency and great amplitude, in combination a support, a plurality of pivots carried by said support at the same distance from said axis, for each pivot a toothed member pivoted on said pivot, toothed parts secured on said apparatus and meshing with said toothed members, whereby said apparatus is adapted to be displaced on great amplitudes with respect to said support, elastic means between each of said members and its pivot adapted to resist elastically to displacements of little amplitude and to yield for displacements of great amplitude between said apparatus and said support, and aperiodic damping means carried by said support and connected with at least one of said members and adapted to resist elastically to displacements of great amplitude between said apparatus and said support.

3. In a suspension for an apparatus having parts rotating or oscillating about an axis and subjected to vibrations of high frequency and little amplitude and to vibrations of low frequency and great amplitude, in combination a support, a plurality of pivots carried by said support and disposed substantially in a parallel direction with relation to said axis of oscillation, aperiodic damping means carried by said support and adapted to resist elastically to displacements of great amplitude, a member pivoted on each pivot and engaging said apparatus, for one at least of said members an arm connected to said member and adapted to operate said damping means, and elastic means between each member and its pivot adapted to resist elastically to displacements of little amplitude and to yield for displacements of great amplitude.

4. A suspension according to claim 3, in which said aperiodic damping means consist of at least one container of elastic and flexible material containing a fluid.

5. A suspension according to claim 3, in which the useful length of said member engaging said apparatus is shorter than the useful length of said arm adapted to operate said damping means.

6. A suspension for mounting an engine having cylinders in line on a support comprising in combination two longitudinal and substantially horizontal bars on which said engine is secured and disposed at the same distance from the axis of the crankshaft of said engine on either side of the vertical plane passing through said axis, two longitudinal beams substantially parallel to said bars and secured to said support, a plurality of pairs of pivots secured respectively on said bars and on said beams, connecting links between the two pivots of each pair, whereby said engine is adapted to be displaced on great amplitudes with respect to said support, elastic means between each link and its corresponding pivots adapted to resist elastically to displacements of little amplitude and to yield for displacements of great amplitude between said engine and said support, an extension provided on at least one of said links and having its end at a greater distance from the pivot of said link secured on said beam than the distance between the two pivots of said link, aperiodic damping means carried by said support, and connecting means between said end of said extension and said aperiodic damping means.

7. A suspension for mounting an engine having cylinders disposed substantially radially about a crankshaft on a support comprising in combination two annuli substantially concentric with the axis of said crankshaft and secured respectively on said engine and on said support, a plurality of pairs of pivots secured respectively on the annulus secured on said engine and on the annulus secured on said support, connecting links between the two pivots of each pair, whereby said engine is adapted to be displaced on great amplitudes with respect to said support, elastic means between each link and its corresponding pivots adapted to resist elastically to displacements of little amplitude and to yield for displacements of great amplitude between said engine and said support, an extension provided on at least one of said links and having its end at a greater distance from the pivot secured on the annulus carried by said support than the distance between the two pivots of said link, aperiodic damping means carried by said support, and connecting means between said end of said extension and said aperiodic damping means.

8. A suspension for mounting an engine having cylinders disposed substantially radially about a crankshaft on a support comprising in combination two annuli substantially concentric with the axis of said crankshaft and secured respectively on said engine and on said support, a plurality of pivots carried by one of said annuli, for each pivot a toothed member pivoted on said pivot, toothed parts secured on the other of said annuli and meshing with said toothed members, elastic means between each of said members and its pivot adapted to resist elastically to displacements of little amplitude and to yield for displacements of great amplitude between said engine and said support, an extension provided on at least one of said members and having its end more distant from the pivot of said member than the corresponding toothed part, aperiodic damping means carried on said support, and connecting means between said end of said extension and said aperiodic damping means.

EUGÈNE PROSPER RENAUX.
LUCIEN JULES RENAUX.